United States Patent
Seto

(10) Patent No.: US 11,027,737 B2
(45) Date of Patent: Jun. 8, 2021

(54) TRAVEL CONTROL APPARATUS AND TRAVEL CONTROL METHOD

(71) Applicant: DENSO CORPORATION, Kariya (JP)

(72) Inventor: Ouhisa Seto, Kariya (JP)

(73) Assignee: DENSO CORPORATION, Kariya (JP)

( * ) Notice: Subject to any disclaimer, the term of this patent is extended or adjusted under 35 U.S.C. 154(b) by 353 days.

(21) Appl. No.: 15/577,678

(22) PCT Filed: May 7, 2016

(86) PCT No.: PCT/JP2016/002255
§ 371 (c)(1),
(2) Date: Nov. 28, 2017

(87) PCT Pub. No.: WO2016/194300
PCT Pub. Date: Dec. 8, 2016

(65) Prior Publication Data
US 2018/0154896 A1 Jun. 7, 2018

(30) Foreign Application Priority Data
May 31, 2015 (JP) .............................. JP2015-110991

(51) Int. Cl.
*B60W 30/00* (2006.01)
*B60W 30/182* (2020.01)
(Continued)

(52) U.S. Cl.
CPC .......... *B60W 30/182* (2013.01); *B60K 28/02* (2013.01); *B60W 40/08* (2013.01);
(Continued)

(58) Field of Classification Search
CPC ............................................... B60W 2050/007
See application file for complete search history.

(56) References Cited

U.S. PATENT DOCUMENTS

| 8,509,982 B2* | 8/2013 | Montemerlo | ........ G05D 1/0214 |
| | | | 701/26 |
| 8,676,431 B1* | 3/2014 | Mariet | ..................... B60T 7/22 |
| | | | 701/28 |

(Continued)

FOREIGN PATENT DOCUMENTS

| JP | 2001-219760 A | 8/2001 |
| JP | 2002-329300 A | 11/2002 |

(Continued)

*Primary Examiner* — Truc M Do
(74) *Attorney, Agent, or Firm* — Maschoff Brennan

(57) ABSTRACT

A travel control apparatus is provided. The travel control apparatus includes: a travel control unit that controls the travel of the vehicle in the control state of one of the manual travel control state and the automatic travel control state in accordance with a selection by the driver; a concentration disturbing matter detection unit that detects an occurrence of a predetermined concentration disturbing matter set as a matter which disturbs a concentration of the driver with respect to the driving operation; and a control state switching unit that switches the control state from the manual travel control state to the automatic travel control state when the occurrence of the concentration disturbing matter is detected while the control state is the manual travel control state.

7 Claims, 12 Drawing Sheets

(51) Int. Cl.

| | | |
|---|---|---|
| *G06N 20/00* | (2019.01) | |
| *B60W 50/08* | (2020.01) | |
| *B60K 28/02* | (2006.01) | |
| *G08G 1/16* | (2006.01) | |
| *B60W 50/14* | (2020.01) | |
| *B60W 40/08* | (2012.01) | |
| *B60W 50/00* | (2006.01) | |

(52) U.S. Cl.
CPC ........ *B60W 50/082* (2013.01); *B60W 50/087* (2013.01); *B60W 50/14* (2013.01); *G06N 20/00* (2019.01); *G08G 1/162* (2013.01); *B60W 2050/0071* (2013.01); *B60W 2050/0088* (2013.01); *B60W 2420/54* (2013.01); *B60W 2540/215* (2020.02); *B60W 2540/22* (2013.01)

(56) References Cited

U.S. PATENT DOCUMENTS

| | | | | |
|---|---|---|---|---|
| 9,637,135 | B2* | 5/2017 | Muramatsu | B60W 50/14 |
| 9,944,291 | B2* | 4/2018 | Gordon | B60W 30/182 |
| 9,969,405 | B2* | 5/2018 | Otake | B60W 10/20 |
| 10,101,742 | B2* | 10/2018 | Prokhorov | B60W 30/143 |
| 2003/0088344 | A1 | 5/2003 | Oda et al. | |
| 2014/0088814 | A1* | 3/2014 | You | G05D 1/0061 |
| | | | | 701/23 |
| 2014/0156134 | A1* | 6/2014 | Cullinane | B60W 50/082 |
| | | | | 701/23 |
| 2015/0066284 | A1* | 3/2015 | Yopp | B60W 30/00 |
| | | | | 701/29.2 |
| 2015/0211868 | A1 | 7/2015 | Matsushita et al. | |
| 2015/0291216 | A1* | 10/2015 | Sato | B62D 15/0265 |
| | | | | 701/23 |
| 2016/0039428 | A1* | 2/2016 | Odate | B60W 50/082 |
| | | | | 701/23 |
| 2016/0041553 | A1* | 2/2016 | Sato | B60W 50/14 |
| | | | | 701/23 |
| 2016/0207536 | A1* | 7/2016 | Yamaoka | B60W 30/182 |
| 2016/0209840 | A1* | 7/2016 | Kim | G05D 1/0088 |
| 2016/0209841 | A1* | 7/2016 | Yamaoka | G05D 1/0061 |
| 2017/0038774 | A1* | 2/2017 | Ebina | B60W 50/14 |
| 2017/0176991 | A1* | 6/2017 | Hoskeri | G01C 21/34 |

FOREIGN PATENT DOCUMENTS

| | | |
|---|---|---|
| JP | 2005-250564 A | 9/2005 |
| JP | 2008-305319 A | 12/2008 |
| JP | 2011-131838 | 7/2011 |
| JP | 2011-221667 A | 11/2011 |

* cited by examiner

FIG. 13

| | LEARNING TARGET MATTER | NUMBER OF OCCURRENCES | NUMBER OF DEVIATIONS | DEVIATION RATE | PRESENCE/ABSENCE OF SETTING AS CONCENTRATION DISTURBING MATTER |
|---|---|---|---|---|---|
| CELLULAR PHONE RELATED | INCOMING CALL | 15 | 5 | 33.3% | YES |
| | RESPONSE | 8 | 4 | 50% | YES |
| | TELEPHONE CONVERSATION | 8 | 1 | 12.5% | NO |
| | DISCONNECTION | 8 | 2 | 25% | NO |
| | OUTGOING CALL | 3 | 1 | — | NO |
| AUDIO DEVICE RELATED | FUNCTION A | 25 | 13 | 52% | YES |
| | FUNCTION B | 8 | 2 | 25% | NO |
| | FUNCTION C | 40 | 25 | 62.5% | YES |
| | FUNCTION D | 10 | 2 | 20% | NO |

TRAVEL CONTROL APPARATUS AND TRAVEL CONTROL METHOD

CROSS REFERENCE TO RELATED APPLICATION

This application is based on Japanese Patent Application No. 2015-110991 filed on May 31, 2015, the disclosure of which is incorporated herein by reference.

TECHNICAL FIELD

The present disclosure relates to a technique that makes a switch between a manual travel control state and an automatic travel control state to control the travel of a vehicle.

BACKGROUND ART

Due to the advancement of a so-called automatic traveling technology, automatic traveling in which an automobile grasps a condition around the automobile and automatically performs a driving operation is becoming possible. For example, in a traveling environment that is suitable for automatic traveling such as an expressway, it is possible to safely travel to a previously set destination while automatically recognizing a vehicle which is traveling ahead and a current traveling lane.

Further, there has also been proposed a technique for improving the safety of travel by automatic traveling in a traveling environment in which a plurality of vehicles come and go such as a street way by not only recognizing the positions and the traveling directions of the vehicles, but also by predicting movements of the vehicles avoiding each other (Patent Literature 1).

However, in a crowded street way, for example, a pedestrian walkway along a road cannot be clearly recognized or predictive driving against running out into the street is required. Thus, a high degree of determination on the situation is required, and it is thus difficult to sufficiently ensure the safety of travel by automatic traveling. Therefore, it is considered that, in such a traveling environment, manual traveling by the driver is still safer.

PRIOR ART LITERATURES

Patent Literature

Patent Literature 1: JP-2011-221667-A

SUMMARY OF INVENTION

However, the driver cannot always concentrate on driving, and the driver's attention may be temporarily reduced due to some reasons. While the attention is reduced, the safety of travel cannot be always ensured even by manual traveling.

In view of the above circumstance, it is an object of the present disclosure to provide a technique that makes it possible to further improve the safety of travel during manual traveling.

A travel control apparatus and a travel control method according to one aspect of the present disclosure detect the occurrence of a predetermined concentration disturbing matter set as a matter that disturbs the concentration of a driver on a driving operation when a vehicle is in a manual travel control state. When the occurrence of the concentration disturbing matter is detected during the manual travel control state, the control state of the vehicle is switched from the manual travel control state to an automatic travel control state.

Accordingly, even when the concentration disturbing matter occurs when the vehicle is in the manual travel control state and the attention of the driver to driving is thereby temporarily reduced, the control state of the vehicle is switched to the automatic travel control state. Thus, it is possible to ensure the safety of travel.

BRIEF DESCRIPTION OF DRAWINGS

The above and other objects, features and advantages of the present disclosure will become more apparent from the following detailed description made with reference to the accompanying drawings. In the drawings:

FIG. 13 is an explanatory diagram illustrating a state of learning the concentration disturbing matter.

EMBODIMENTS FOR CARRYING OUT INVENTION

Hereinbelow, an embodiment will be described.

A: Apparatus Configuration

Figure 1:
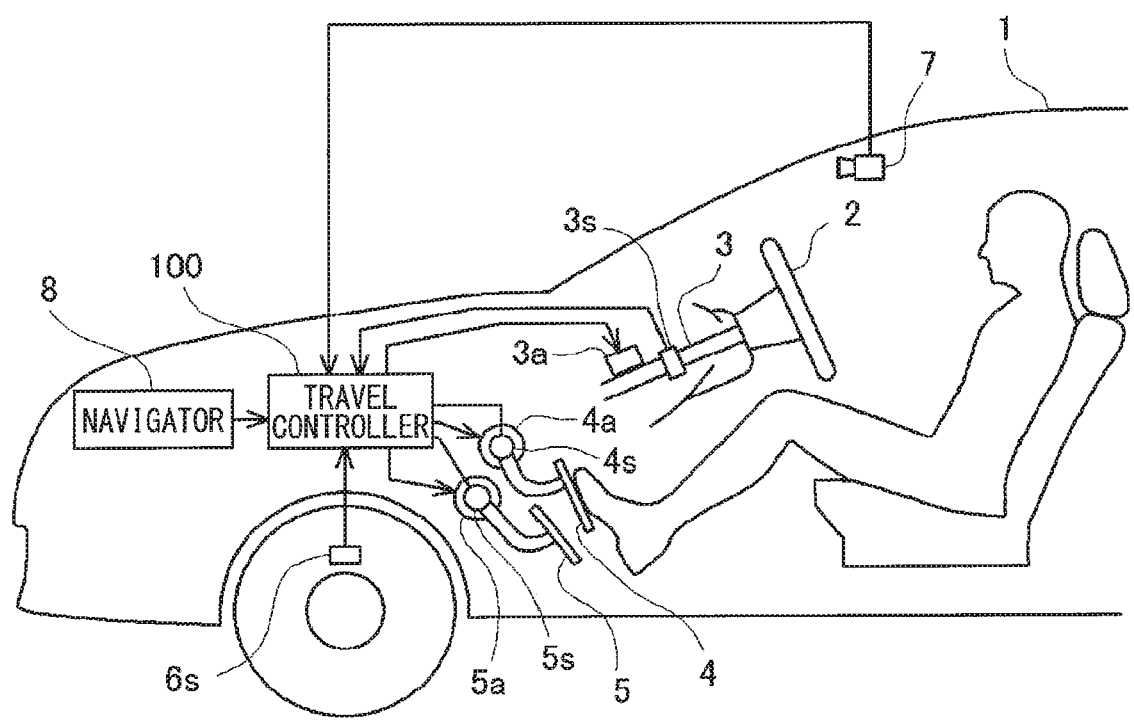
FIG. 1 is an explanatory diagram illustrating a vehicle which is equipped with a travel control apparatus of an embodiment.

FIG. 1 illustrates a general configuration of a vehicle 1 which is equipped with a travel control apparatus 100 of the present embodiment. As illustrated in FIG. 1, the vehicle 1 is equipped with a steering wheel 2, a steering shaft 3, an accelerator pedal 4, a brake pedal 5, an onboard camera 7, and a navigation device 8 in addition to the travel control apparatus 100.

The steering shaft 3 is equipped with a steering angle sensor 3s which detects a steering angle of the steering wheel 2 and a steering wheel drive unit 3a which drives the steering shaft 3 to rotate. Further, the accelerator pedal 4 is equipped with an accelerator sensor 4s which detects a depression amount of the accelerator pedal 4 and an accelerator drive unit 4a which drives the accelerator pedal 4. Further, the brake pedal 5 is equipped with a brake sensor 5s which detects a depression amount of the brake pedal 5 and a brake drive unit 5a which drives the brake pedal 5. Further, the vehicle 1 is also equipped with a vehicle speed sensor 6s which detects a vehicle speed by detecting the rotation of a tire or an axle.

The steering angle sensor 3s, the accelerator sensor 4s, the brake sensor 5s, and the vehicle speed sensor 6s are connected to the travel control apparatus 100. Further, the onboard camera 7 and the navigation device 8 are also connected to the travel control apparatus 100. The travel control apparatus 100 grasps a traveling condition of the vehicle 1 on the basis of output from these various sensors, an image captured by the onboard camera 7, and information from the navigation device 8. The travel control apparatus 100 is also capable of supporting a driving operation of a driver or causing the vehicle 1 to automatically travel by driving the steering wheel drive unit 3a, the accelerator drive unit 4a, and the brake drive unit 5a on the basis of the result of the traveling condition.

Figure 2:
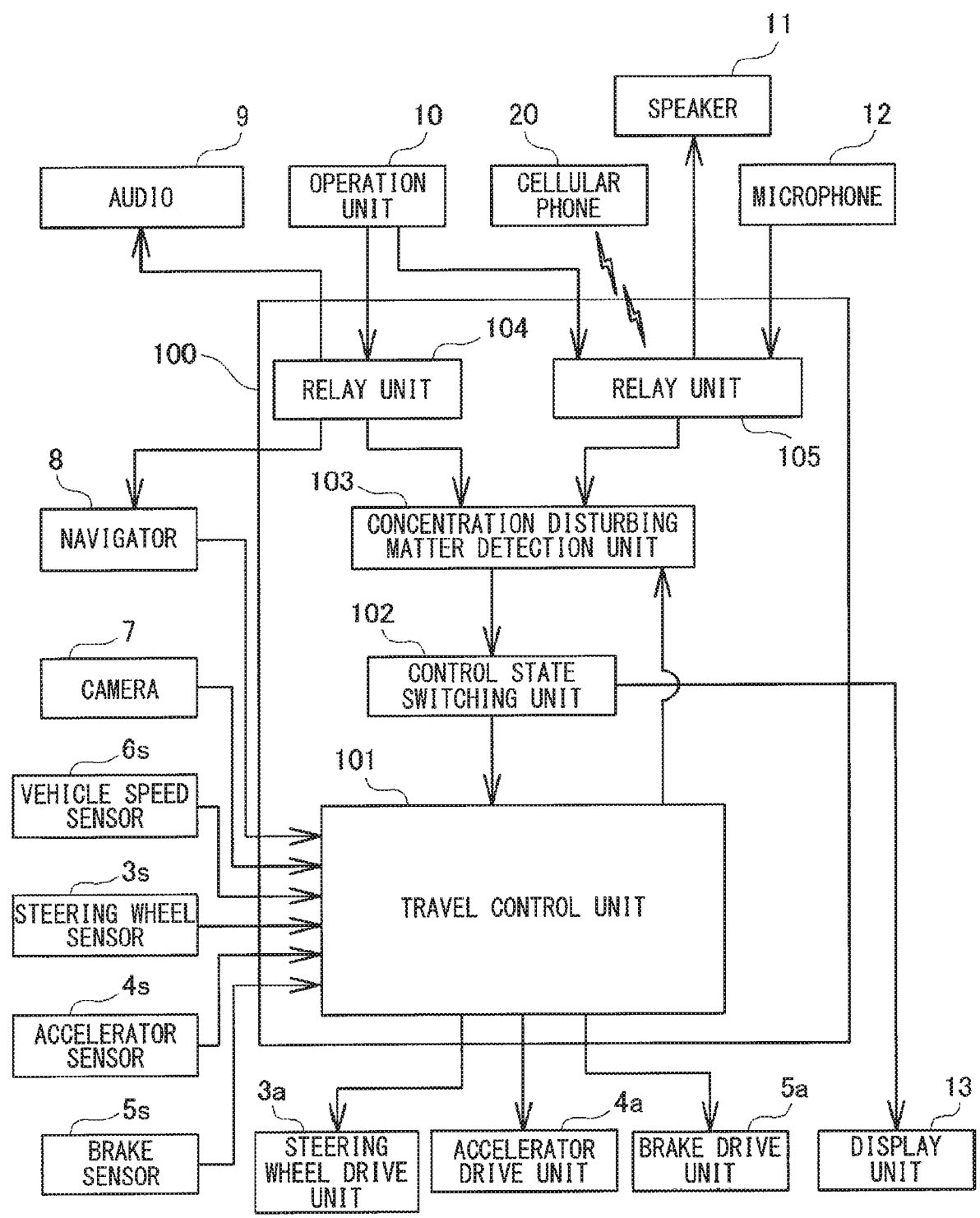
FIG. 2 is a block diagram illustrating an internal configuration of the travel control apparatus of the embodiment.

FIG. 2 illustrates a general internal structure of the travel control apparatus 100 of the present embodiment. As illustrated, the travel control apparatus 100 is provided with a travel control unit 101, a control state switching unit 102, a concentration disturbing matter detection unit 103, an operation relay unit 104, and a wireless relay unit 105. Note that these "units" are abstract concepts obtained by expedientially classifying the inside of the travel control apparatus 100 by focusing on functions which are provided in the travel control apparatus 100 for controlling the travel of the vehicle 1. Thus, these units do not represent that the travel control apparatus 100 is physically classified into the "units". Each of the "units" can be implemented as a computer program executed by a CPU, implemented as an electronic circuit which includes an LSI and a memory, or implemented as a combination of the computer program and the electronic circuit.

The travel control unit 101 has a function of governing the entire control relating to the travel of the vehicle 1. The travel control apparatus 100 of the present embodiment is capable of causing the vehicle 1 to automatically travel as described above, and this function is mainly implemented by the travel control unit 101. Further, the travel control apparatus 100 is also capable of supporting the driving operation of the driver when the vehicle 1 manually travels, and this function is also mainly implemented by the travel control unit 101. Corresponding to this, there are two control states including a manual travel control state and an automatic travel control state as a control state of the travel control unit 101 of the present embodiment for controlling the travel of the vehicle 1.

In the manual travel control state, the travel control unit 101 executes various processes for supporting the driving operation of the driver using information acquired from the steering angle sensor 3s, the accelerator sensor 4s, the brake sensor 5s, the vehicle speed sensor 6s, the onboard camera 7, and the navigation device 8.

On the other hand, in the automatic travel control state, the travel control unit 101 grasps a condition around the vehicle 1, a state of the vehicle 1, and, further, a traveling position on the basis of information acquired from the steering angle sensor 3s, the accelerator sensor 4s, the brake sensor 5s, the vehicle speed sensor 6s, the onboard camera 7, and the navigation device 8. Then, the travel control unit 101 drives the steering wheel drive unit 3a, the accelerator drive unit 4a, and the brake drive unit 5a on the basis of the result thereof to achieve automatic traveling.

Further, the travel control unit 101 is normally in the manual travel control state. When the driver selects the automatic travel control state, it is determined whether the current traveling position is suitable for automatic traveling, and a switch from the manual travel control state to the automatic travel control state is made when the current traveling position is suitable for automatic traveling. In the navigation device 8 of the present embodiment, an area which is unsuitable for automatic traveling is previously stored. The travel control unit 101 can determine whether the current traveling position is an area suitable for automatic traveling on the basis of the stored information.

In addition, in the travel control apparatus 100 of the present embodiment, even when the automatic travel control state is not selected by the driver and the current traveling position is unsuitable for automatic traveling, the control state may be temporarily switched from the manual travel control state to the automatic travel control state. The control state switching unit 102 and the concentration disturbing matter detection unit 103 illustrated in FIG. 2 are provided corresponding to this switch.

First, when the concentration disturbing matter detection unit 103 receives information indicating the manual travel control state from the travel control unit 101, the concentration disturbing matter detection unit 103 monitors whether a predetermined matter that disturbs the concentration of the driver on driving (concentration disturbing matter) has occurred. A predetermined matter such as an incoming call of a cellular phone to the driver or an operation with respect to the navigation device 8 or an audio device 9 mounted on the vehicle 1 is previously set as the concentration disturbing matter. In the present embodiment, the navigation device 8 and the audio device 9 correspond to an onboard device.

The concentration disturbing matter detection unit 103 is connected to the wireless relay unit 105 which wirelessly transmits and receives data to and from a cellular phone 20 which is previously registered and capable of detecting an incoming call to the cellular phone 20 by acquiring information from the wireless relay unit 105.

Further, the wireless relay unit 105 is also capable of outputting voice data received from the cellular phone 20 from a speaker 11 which is mounted on the vehicle 1 and outputting voice data picked up by a highly directional microphone 12 which is mounted on the vehicle 1 to the cellular phone 20.

Further, the wireless relay unit 105 is also connected to an operation unit 10 which is operated by the driver. Thus, the concentration disturbing matter detection unit 103 is capable of detecting an incoming call to the cellular phone 20 or the start or disconnection of a telephone call in accordance with an operation to the operation unit 10 by the driver by receiving a signal from the wireless relay unit 105.

Further, the concentration disturbing matter detection unit 103 is also connected to the operation relay unit 104 which relays information indicating that the operation unit 10 such as buttons operated by the driver has been operated to the navigation device 8 or the audio device 9. Thus, the concentration disturbing matter detection unit 103 is capable of detecting that the driver has operated the navigation device 8 or the audio device 9 on the basis of information from the operation relay unit 104.

When the concentration disturbing matter detection unit 103 detects the occurrence of a previously set concentration disturbing matter during control of the travel control unit 101 in the manual travel control state, the concentration disturbing matter detection unit 103 notifies the control state switching unit 102 of the occurrence of the concentration disturbing matter.

When the control state switching unit 102 receives the notification of the occurrence of the concentration disturbing matter, the control state switching unit 102 displays a message which indicates switching the control state from the manual travel control state to the automatic travel control state on a display unit 13 such as a liquid crystal screen which is mounted on the vehicle 1. Then, a signal which indicates switching the control state from the manual travel control state to the automatic travel control state is output to the travel control unit 101. Accordingly, the travel control unit 101 temporarily switches the control state from the manual travel control state to the automatic travel control state.

Accordingly, when a matter that disturbs the concentration of the driver on the driving operation occurs during control in the manual travel control state, the control state is temporarily switched from the manual travel control state to the automatic travel control state. Thus, it is possible to ensure the safety of travel. Of course, the concentration disturbing matter may occur during travel in an area which is unsuitable for automatic traveling. However, also in such a case, temporary automatic traveling makes it possible to ensure the safety of travel as compared with manual traveling by the driver who has lack of concentration on the driving operation.

Hereinbelow, a process which is performed inside the travel control apparatus 100 of the present embodiment for achieving the above will be described in detail.

B. Travel Control State Switching Process

Figure 3:
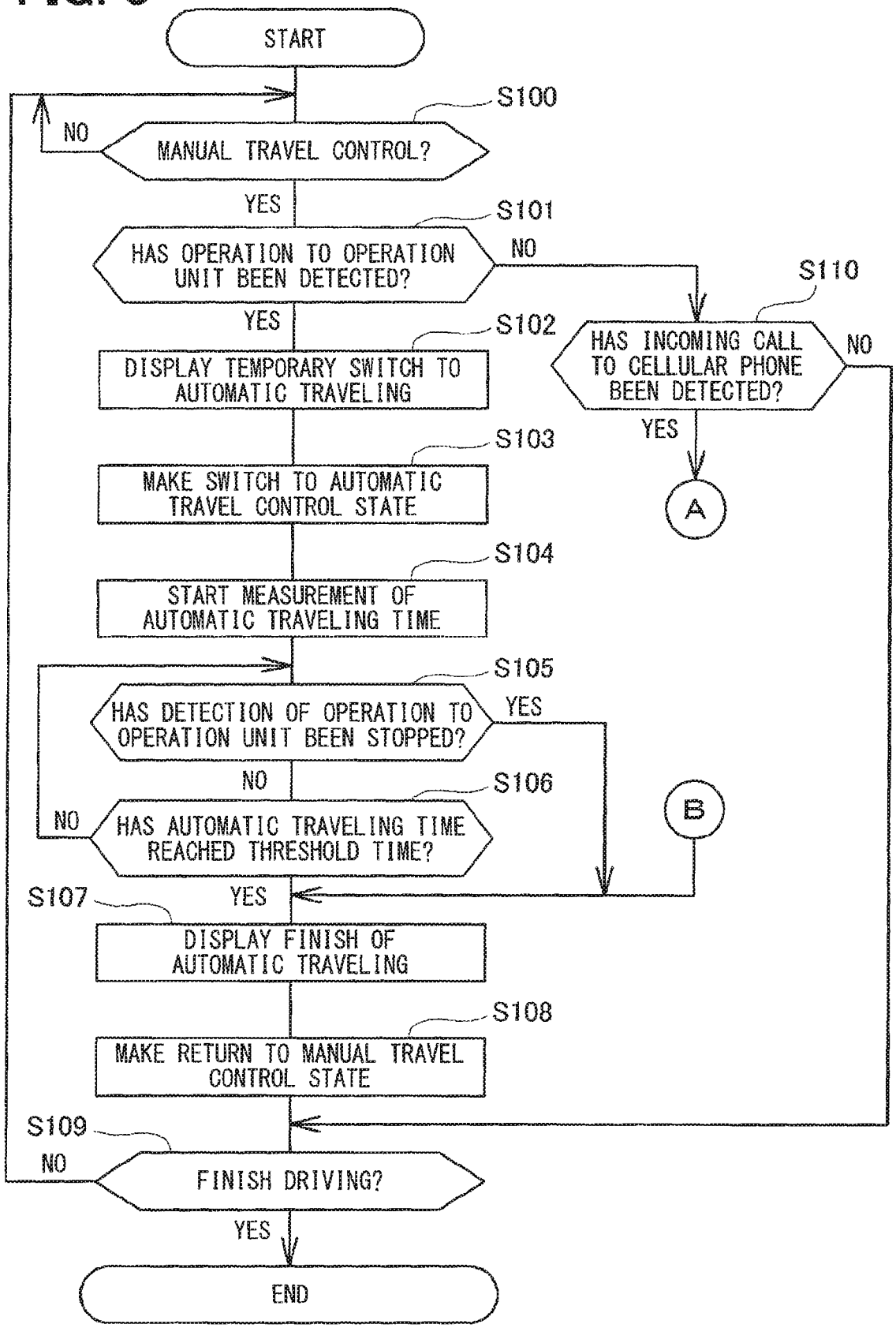
FIG. 3 is a flowchart illustrating a part of a travel control state switching process which is executed by the travel control apparatus of the embodiment for switching a travel control state.
Figure 4:
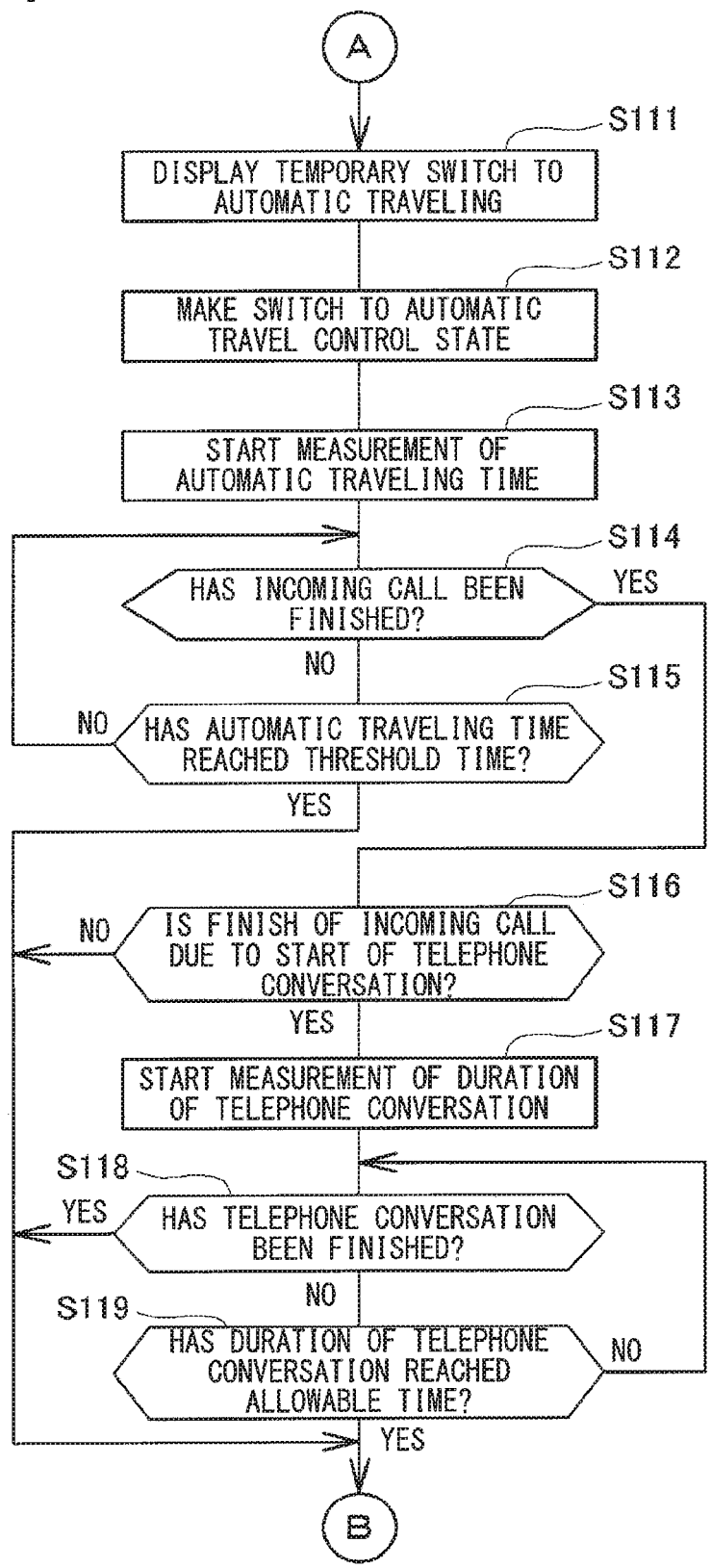
FIG. 4 is a flowchart illustrating the rest part of the travel control state switching process.

FIGS. 3 and 4 illustrate flowcharts of a travel control state switching process which is performed by the travel control apparatus 100 of the present embodiment for temporarily switching the control state to the automatic travel control state during the manual travel control state.

As illustrated in FIG. 3, when the travel control state switching process is started, it is first determined whether the current control state is the manual travel control state (S100). As described above, the travel control apparatus 100 controls the travel of the vehicle 1 in either the manual travel control state or the automatic travel control state. Thus, the travel control apparatus 100 is capable of immediately determining whether the current control state is either the manual travel control state or the automatic travel control state.

When the result shows that it is determined that the current control state is not the manual travel control state (S100: no), the following process for making a temporary switch from the manual travel control state to the automatic travel control state is not required because the current control state is already the automatic travel control state. Thus, the process returns to the start, and it is again determined whether the control state is the manual travel control state (S100).

When it is determined that the control state is the manual travel control state during the repetition of such a determination (S100: yes), it is then determined whether an operation to the operation unit 10 has been detected (S101).

Figure 5:
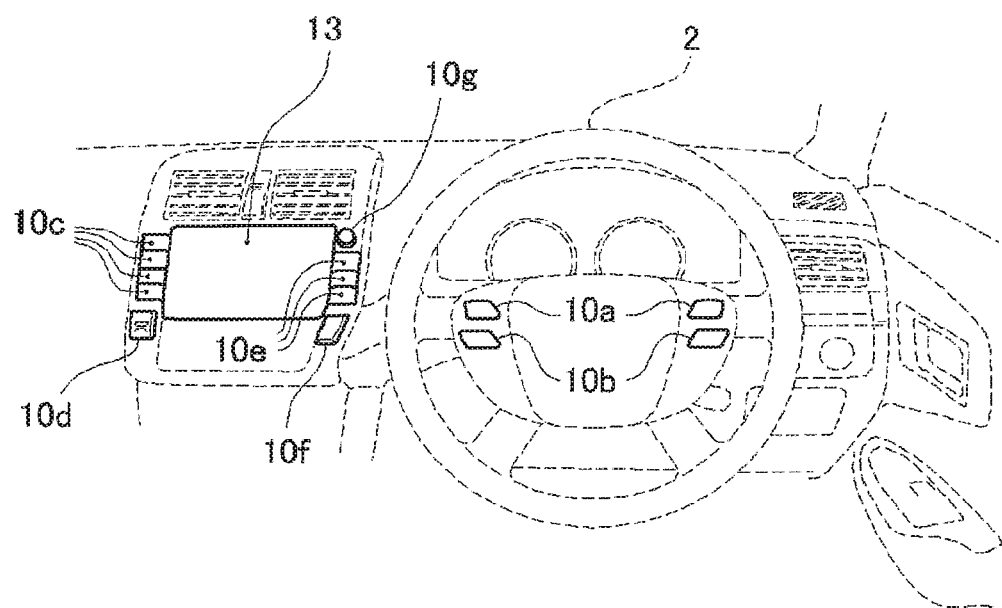
FIG. 5 is an explanatory diagram illustrating an operation unit which is mounted on the vehicle.

FIG. 5 illustrates the operation unit 10 which is mounted on the vehicle 1 of the present embodiment. For example, an operation button 10a which is operated in responding to an incoming telephone call and an operation button 10b which is operated in finishing a telephone conversation and disconnecting the connection are mounted on the steering wheel 2. Further, the liquid crystal screen is mounted on the dashboard of the vehicle 1 as the display unit 13 which displays various pieces of information. A plurality of operation buttons 10c, 10d, 10e, 10f and an operation knob 10g are mounted on the right and left of the liquid crystal screen.

The display unit 13 also serves as a display screen for the navigation device 8 and an operation screen for the audio device 9. When the display unit 13 is used as the display screen for the navigation device 8, functions for operating the navigation device 8 are assigned to the operation buttons 10c to 10f and the operation knob 10g. When the display unit 13 is used as the operation screen for the audio device 9, functions for operating the audio device 9 are assigned to the operation buttons 10c to 10f and the operation knob 10g.

In S101 of FIG. 3, it is determined whether these operation buttons 10a to 10f and operation knob 10g have been operated. When the result shows that none of these operation buttons 10a to 10f and operation knob 10g has been operated (S101: no), it is determined whether an incoming call to the previously registered cellular phone 20 has been detected (S110). As described above with reference to FIG. 2, the travel control apparatus 100 is capable of wirelessly transmitting and receiving data to and from the cellular phone 20 and capable of immediately recognizing an incoming call to the cellular phone 20.

When the result shows that no incoming call to the cellular phone 20 has been detected (S110: no), it is determined that a matter that disturbs the concentration of the driver on the driving operation (concentration disturbing matter) has not occurred. That is, in the present embodiment, an operation to the operation unit 10 and an incoming call to the cellular phone 20 are previously set as the concentration disturbing matters. Thus, when these concentration disturbing matters have not been detected, it is possible to determine that no concentration disturbing matter has occurred. Of course, the concentration disturbing matter is not limited to these matters, and another matter may be set as the concentration disturbing matter as needed.

Then, when no concentration disturbing matter has occurred (S101: no and S110: no), it is determined whether to finish driving (S109). When driving is not finished (S109: no), the process returns to the start and it is again determined whether the current control state is the manual travel control state (S100).

On the other hand, when an operation to the operation unit 10 has been detected (S101), it is considered that the driver tries to operate the navigation device 8 or the audio device 9 and has lost his/her concentration on the driving operation.

Figure 6:
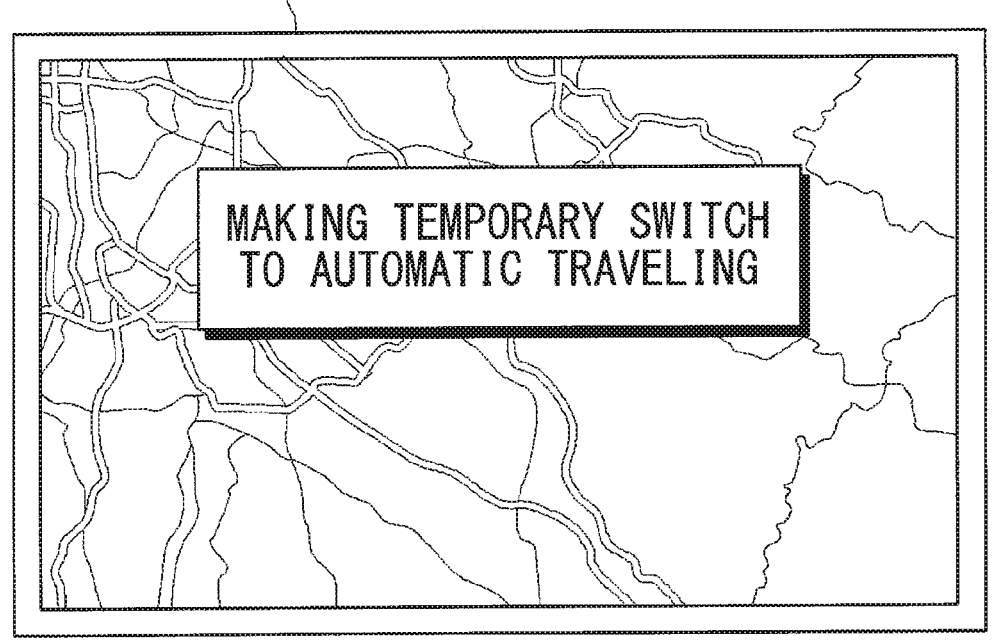
FIG. 6 is an explanatory diagram illustrating a display which indicates making a temporary switch to an automatic travel control state.

Thus, it is determined to temporarily switch the control state from the manual travel control state to the automatic travel control state, and a display for notifying the driver of the switch is output onto the screen of the display unit 13 (S102). FIG. 6 illustrates a state in which a message which indicates temporarily switching the control state to the automatic travel control state is displayed on the screen of the display unit 13.

Then, the control state is switched from the manual travel control state to the automatic travel control state (S103) and a measurement of an automatic traveling time is then started by starting a timer which is incorporated in the travel control apparatus 100 (S104). Here, the automatic traveling time is an elapsed time from the switch of the control state to the automatic travel control state due to the occurrence of the concentration disturbing matter.

Then, it is determined whether the detection of the operation to the operation unit 10 has been stopped, that is, it is determined whether the operation unit 10 is again operated within a predetermined time (e.g., 5 seconds) (S105). When the result shows that the operation to the operation unit 10 has been stopped (S105: yes), it can be considered that there is no concentration disturbing matter which disturbs the concentration of the driver on the driving operation. Thus, a message which indicates finishing the temporary automatic travel control state is displayed on the screen of the display unit 13 (S107). Then, the control state is returned to the manual travel control state from the automatic travel control state (S108).

Figure 7:
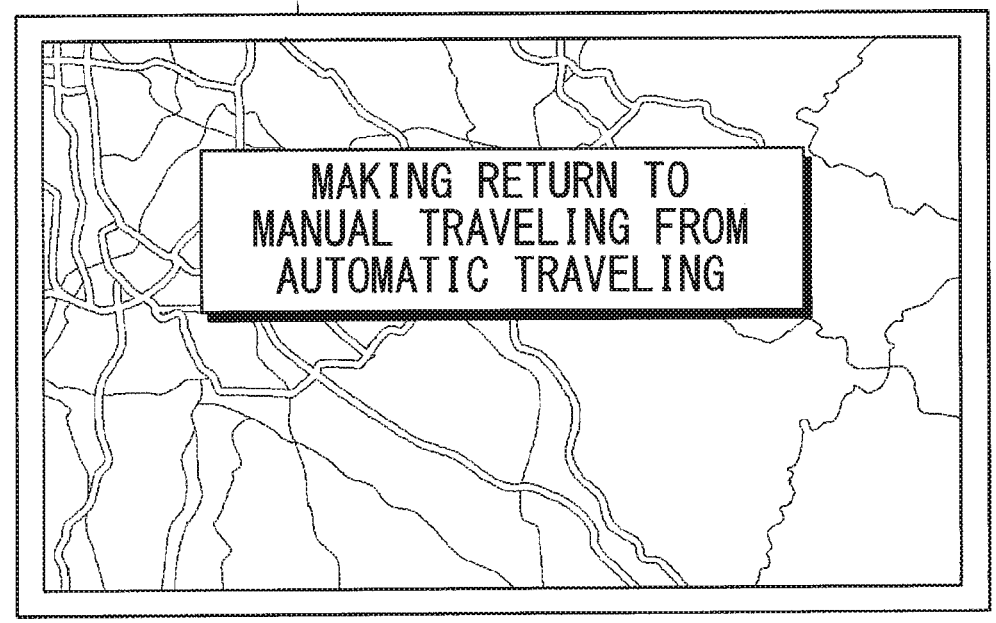
FIG. 7 is an explanatory diagram illustrating a display which indicates making a return to a manual travel control state from the temporary automatic travel control state.

FIG. 7 illustrates a state in which a display which indicates finishing the temporary automatic travel control state is output onto the screen of the display unit 13.

On the other hand, when an operation to the operation unit 10 has been detected within the predetermined time (e.g., 5 seconds) again (S105: yes), it is considered that there is still the concentration disturbing matter.

Thus, at this time, it is determined whether the automatic traveling time has reached a predetermined threshold time (e.g., 20 seconds) (S106). That is, when a concentration disturbing matter occurs during manual traveling, the travel control apparatus 100 of the present embodiment ensures the safety of travel by temporarily switching the control state to the automatic travel control state.

At this time, even when a road where the vehicle 1 is traveling is unsuitable for automatic traveling, it is considered that the vehicle 1 can safely travel also by automatic traveling for a short time because the vehicle 1 has been safely driven by the driver until then. However, since the road is unsuitable for automatic traveling, it is considered that it becomes difficult to ensure the safety of travel when the time of automatic traveling becomes long.

Thus, when it is determined that the operation to the operation unit 10 is still continued (S105: no), it is determined whether the automatic traveling time has reached the predetermined threshold time (S106).

When the result shows that the automatic traveling time has not reached the threshold time (S106: no), it is again determined whether the detection of the operation to the operation unit 10 has been stopped while continuing the automatic travel control state (S105).

On the other hand, when the automatic traveling time has reached the threshold time (S106: yes), in order to finish the temporary automatic travel control state, a display indicating the finish of the automatic travel control state (refer to FIG. 7) is output onto the screen of the display unit 13 (S107), and the control state is then returned to the manual travel control state from the automatic travel control state (S108).

When the automatic traveling time has reached the threshold time (S106: yes), a voice which notifies returning the control state to the manual travel control state may be output from the speaker 11 in addition to the display indicating the return which is displayed on the display unit 13.

When the automatic traveling time has reached the threshold time (S106: yes), the control state is returned to the manual travel control state even when the driver continues the operation to the operation unit 10. Thus, it is possible to make the driver reliably recognize that the control state is returned to the manual travel control state by notifying the return also using the voice.

In the above, there has been described the process for temporarily switching the control state to the automatic travel control state (S102 to S108) when an operation to the operation unit 10 has been detected in the manual travel control state (S101: yes). On the other hand, when an incoming call to the cellular phone 20 has been detected in the manual travel control state (S110: yes), the control state is temporarily switched to the automatic travel control state in the following manner.

First, as illustrated in FIG. 6, a display which indicates temporarily switching the control state to the automatic travel control state is output onto the screen of the display unit 13 (S111 of FIG. 4). Then, the control state is switched to the automatic travel control state from the manual travel control state (S112), and a measurement of an automatic traveling time is then started (S113).

Then, it is determined whether the incoming call to the cellular phone 20 has been finished (S114). A case in which the person who has made the call has given up having a telephone conversation and a case in which some response has been made with respect to the incoming call can be considered as the reason for the finish of the incoming call. However, in S114, it is determined whether the incoming call has been finished regardless of the reason.

When the result shows that the incoming call has not been finished (that is, the incoming call is still continued) (S114: no), it is determined whether the automatic traveling time has reached the above threshold time (S115). When the result shows that the automatic traveling time has not reached the threshold time (S115: no), it is again determined whether the incoming call has been finished (S114).

When the driver does not make any response such as starting a telephone conversation or returning a response message notifying that the driver cannot take the call with respect to the incoming call, these determinations are repeatedly performed (S114, S115) until the automatic traveling time reaches the threshold time.

Then, when the automatic traveling time has reached the threshold time (S115: yes), in order to finish the temporary automatic travel control state, a display indicating the finish of the automatic travel control state (refer to FIG. 7) is output onto the screen of the display unit 13 (S107 of FIG. 3), and the control state is then returned to the manual travel control state from the automatic travel control state (S108).

On the other hand, when the incoming call has been finished before the self-traveling traveling time reaches the threshold time (S114 of FIG. 4: yes), it is determined whether the finish of the incoming call is due to the start of a telephone conversation by the driver who has taken the call (S116).

When the result shows that the finish of the incoming call is not due to the start of a telephone conversation (S116: no), it may be considered that there is no concentration disturbing matter anymore because the person who has made the call has given up having a telephone conversation or the driver has transmitted a response message indicating that the driver cannot take the call. Thus, also in this case (S116: no), a display which indicates finishing the temporary automatic travel control state (refer to FIG. 7) is output onto the screen of the display unit 13 (S107 of FIG. 3), and the control state is then returned to the manual travel control state from the automatic travel control state (S108).

On the other hand, when the finish of the incoming call is due to the start of a telephone conversation (S116: yes), a measurement of the duration of the telephone conversation is started (S117), and it is then determined whether the telephone conversation has been finished (S118). When the telephone conversation has not been finished (S118: no), it is determined whether the duration of the telephone conversation has reached an allowable time (S119). When the duration of the telephone conversation has not reached the allowable time (S119: no), it is again determined whether the telephone conversation has been finished (S118).

When the telephone conversation is started in this manner (S116: yes), such determinations are repeatedly performed (S118, S119) until the telephone conversation is finished (S118: yes) or the duration of the telephone conversation reaches the allowable time (S119: yes). Then, when the telephone conversation has been finished (S118: yes) or the duration of the telephone conversation has reached the allowable time (S119: yes), a display which indicates finishing the temporary automatic travel control state (refer to FIG. 7) is output onto the screen of the display unit 13 (S107 of FIG. 3), and the control state is then returned to the manual travel control state from the automatic travel control state (S108).

Here, also when the duration of the telephone conversation has reached the allowable time (S119: yes) in addition to when the telephone conversation has been finished (S118: yes), the control state is returned to the manual travel control state from the automatic travel control state because of the following reason.

Specifically, it is considered that when the driver starts a telephone conversation during manual traveling, the attention of the driver to the driving operation is reduced (that is, the concentration is disturbed). Thus, the travel control apparatus 100 of the present embodiment can ensure the safety of travel by temporarily switching the control state to the automatic travel control state. However, when a road where the vehicle 1 is traveling is unsuitable for automatic traveling, it is considered that it becomes difficult to ensure the safety of travel when the time of automatic traveling becomes long. Thus, also when the duration of the telephone conversation has reached the allowable time (S119: yes), the control state is returned to the manual travel control state from the automatic travel control state.

Here, when a telephone conversation is started (S116: yes), the measurement of the duration of the telephone conversation is started without exception (S117). However, when the traveling position of the vehicle 1 is located in an area suitable for automatic traveling, the measurement of the duration of the telephone conversation may not be started. That is, the driver may have a desire to continue a telephone conversation depending on the contents of the telephone conversation. It is considered that when the traveling position of the vehicle 1 is located in an area suitable for automatic traveling, the safety of travel is not lost even if the automatic warehouse control state is continued until the finish of the telephone conversation.

Thus, when a telephone conversation is started (S116: yes), it may be determined whether the traveling position of the vehicle 1 is located in an area suitable for automatic traveling, and a measurement of the duration of the telephone conversation may be started when the traveling position is not located in the area suitable for automatic traveling (S117).

After the control state is returned to the manual travel control state from the automatic travel control state as described above (S108 of FIG. 3), it is determined whether to finish driving (S109). When driving is not finished (S109: no), the process returns to the start, and it is again determined whether the current control state is the manual travel control (S100). Then, the following series of processes (S101 to S119) described above is repeatedly performed.

When it is determined to finish driving during the repetition of these series of processes (S109: yes), the travel control state switching process illustrated in FIGS. 3 and 4 is finished.

The travel control state switching process as described above is performed inside the travel control apparatus 100 of the present embodiment. Thus, even when a matter that disturbs the concentration of the driver on the driving operation occurs during manual traveling by the driver, it is possible to makes a temporal switch to the automatic travel control state to ensure the safety of travel.

C: Modification

In the travel control apparatus 100 of the embodiment described above, an appropriate matter is previously set as the matter that disturbs the concentration of the driver on the driving operation (concentration disturbing matter). However, the concentration disturbing matter may differ between drivers or depending on traveling environments. Thus, the concentration disturbing matter may be learned so as to correspond to such difference. Hereinbelow, a travel control apparatus 150 of such a modification will be briefly described mainly on the difference from the above embodiment.

Figure 8:
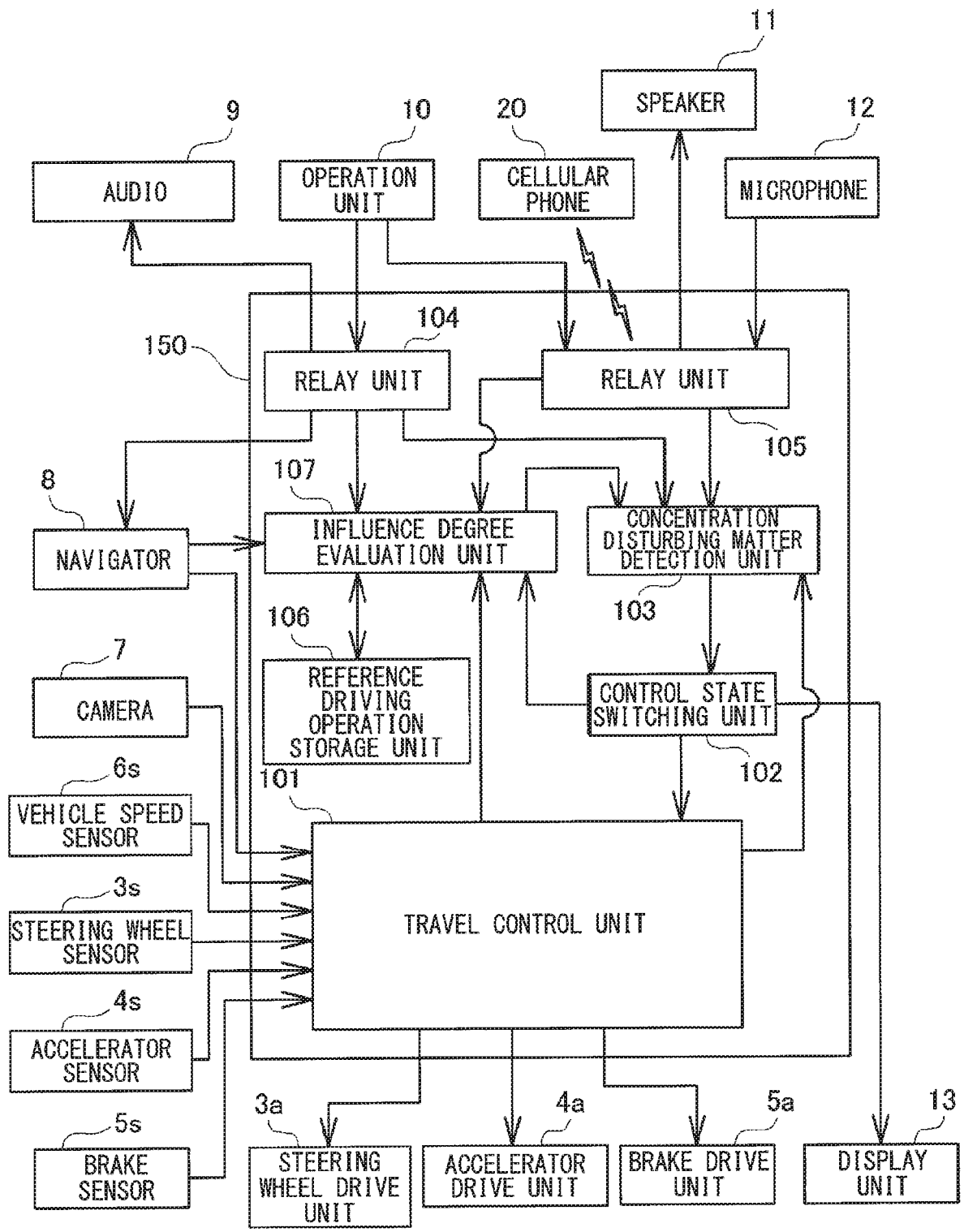
FIG. 8 is a block diagram illustrating an internal configuration of a travel control apparatus of a modification.

FIG. 8 illustrates a general internal configuration of the travel control apparatus 100 of the modification. The travel control apparatus 150 of the modification further includes a reference driving operation storage unit 106 and an influence degree evaluation unit 107 in addition to the configuration of the travel control apparatus 100 of the embodiment described above with reference to FIG. 2.

The influence degree evaluation unit 107 is connected to the operation relay unit 104 and the wireless relay unit 105 and capable of detecting a large number of matters that can be candidates of concentration disturbing matters (learning target matters) such as an operation to the operation unit 10 by the driver, an incoming call to the cellular phone 20, the start of a telephone conversation, and the finish of the telephone conversation. When a learning target matter occurs, the degree of influence of the learning target matter on the concentration of the driver on the driving operation is evaluated, and the result thereof is learned. Although details of a method for evaluating the degree of influence will be described below, the evaluation is generally made in the following manner.

First, the current traveling position of the vehicle 1 is acquired from the navigation device 8. Then, a driving operation of the vehicle 1 when the vehicle 1 travels at the current position in a standard manner (reference driving operation) is acquired.

The reference driving operation corresponding to the existence position of the vehicle 1 is previously stored in the reference driving operation storage unit 106. Thus, the influence degree evaluation unit 107 can acquire the reference driving operation which is stored corresponding to the current position of the vehicle 1 which is acquired from the navigation device 8. The reference driving operation will be described in detail below.

Then, a driving operation which has been actually performed by the driver after the occurrence of the learning target matter (actual driving operation) is acquired from the travel control unit 101 and compared with the reference driving operation.

When the result shows that the actual driving operation is likely to deviate from the reference driving operation (that is, when a deviation between the actual driving operation and the reference driving operation is likely to be large), it can be considered that the learning target matter has an influence on the concentration of the driver on the driving operation. On the other hand, when the actual driving operation is less likely to deviate from the reference driving operation (that is, when a deviation between the actual driving operation and the reference driving operation is less likely to be large), it can be considered that the learning target matter has no influence on the concentration of the driver on the driving operation.

The influence degree evaluation unit 107 performs the above evaluation every time the learning target matter occurs and stores results thereof for the respective learning target matters. Then, as a result of the storage of evaluation results, the learning target matter that is considered to be likely to have an influence on the concentration of the driver on the driving operation is set to the concentration disturbing matter detection unit 103 as the concentration disturbing matter.

This makes it possible to set an appropriate concentration disturbing matter according to differences between drivers or traveling environments. As a result, it is possible to avoid a situation in which a switch from manual traveling to automatic traveling is not made in spite of the fact that a matter that disturbs the concentration of the driver on the driving operation has occurred or a situation in which a switch from manual traveling to automatic traveling is made in spite of the fact that the concentration on the driving operation is not disturbed.

Figure 9:
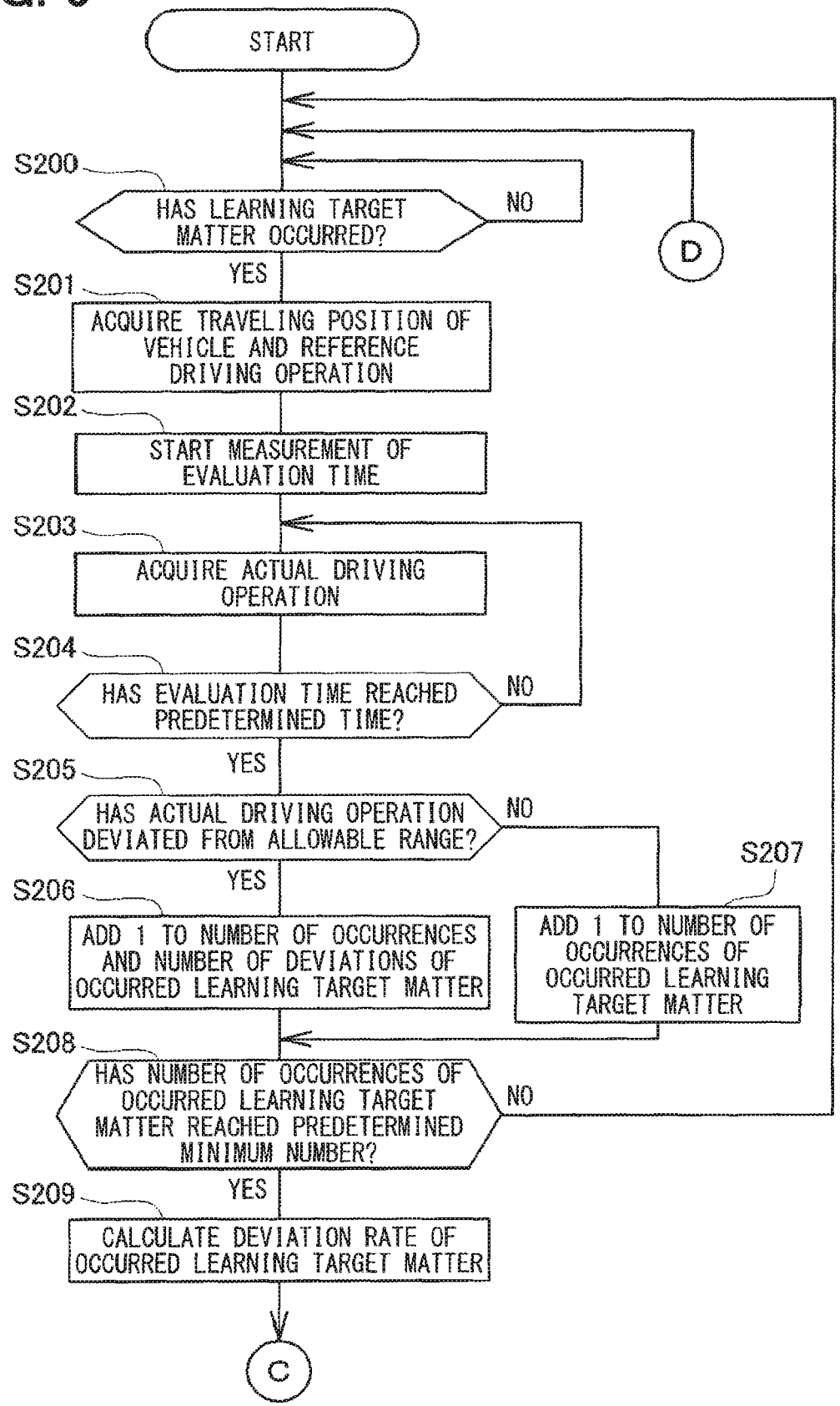
FIG. 9 is a flowchart illustrating a part of a concentration disturbing matter learning process which is executed by the travel control apparatus of the modification for learning a concentration disturbing matter.
Figure 10:
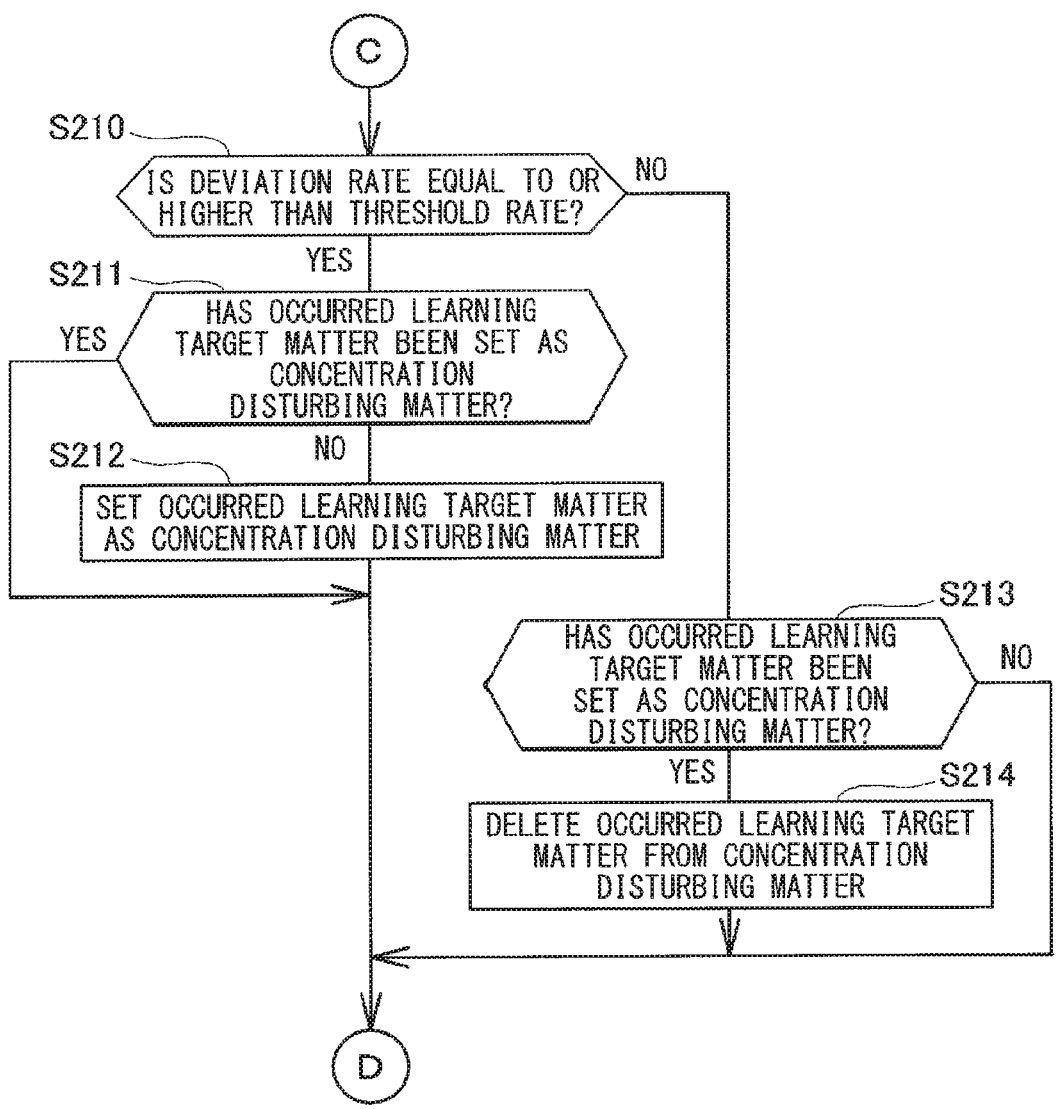
FIG. 10 is a flowchart illustrating the rest part of the concentration disturbing matter learning process.

FIGS. 9 and 10 illustrate flowcharts of a concentration disturbing matter learning process which is executed by the travel control apparatus 150 of the modification for learning the concentration disturbing matter. This process is executed by the travel control apparatus 150 of the modification simultaneously with the travel control state switching process illustrated in FIGS. 3 and 4.

As illustrated, in the concentration disturbing matter learning process, it is first determined whether a learning target matter has occurred (S200). It is desired to detect as many learning target matters as possible that can be concentration disturbing matters. Here, an operation to any of the operation buttons 10a to 10f and the operation knob 10g illustrated in FIG. 5 and an incoming call to the cellular phone 20 are detected as the learning target matters. It is needless to say that a target that is detected as the learning target matter is not limited to these matters, and another matter may be detected.

When the result shows that no learning target matter has occurred (S200: no), the same determination (S200) is repeatedly performed until a learning target matter occurs.

Then, when a learning target matter has occurred (S200: yes), the current traveling position of the vehicle 1 and the reference driving operation at the current position are acquired (S201). In the present modification, the current position of the vehicle 1 is acquired from the navigation device 8. Further, the reference driving operation corresponding to the current position of the vehicle 1 is previously stored in a memory (corresponding to the reference driving operation storage unit 106 of FIG. 8, not illustrated) which is incorporated in the travel control apparatus 150, and the reference driving operation is acquired.

The reference driving operation may be stored not in the memory incorporated in the travel control apparatus 150, but in the navigation device 8. Further, the current position of the vehicle 1 may not be acquired from the navigation device 8, and the travel control apparatus 150 may have a function of detecting the current position of the vehicle 1.

Figure 11A:
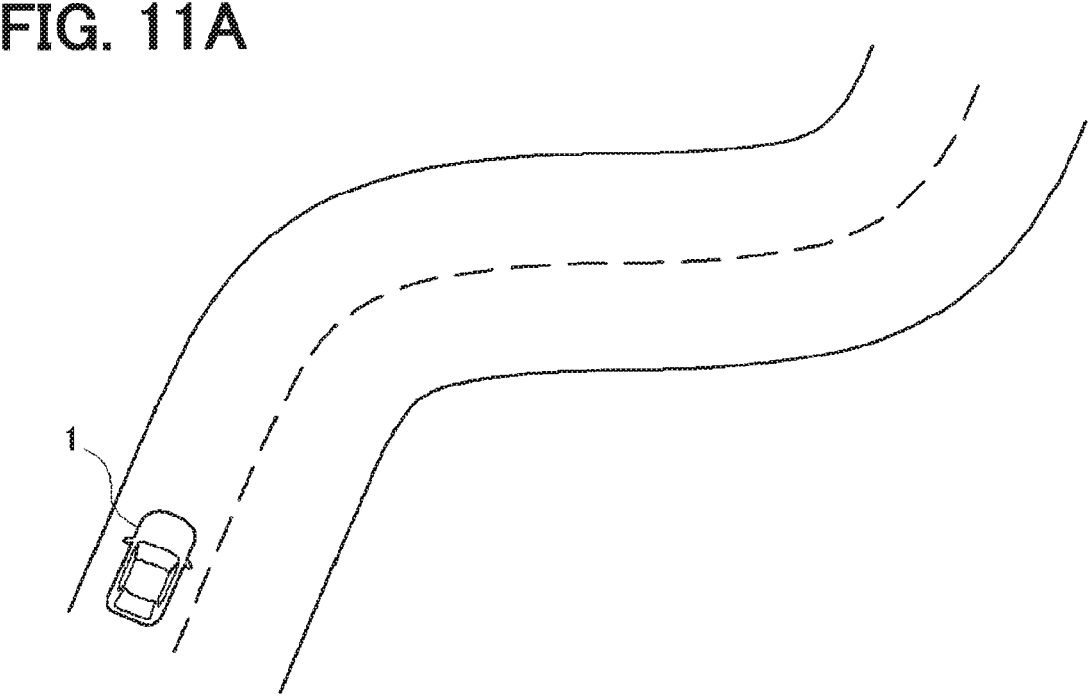
FIG. 11A is an explanatory diagram for a reference driving operation.
Figure 11B:
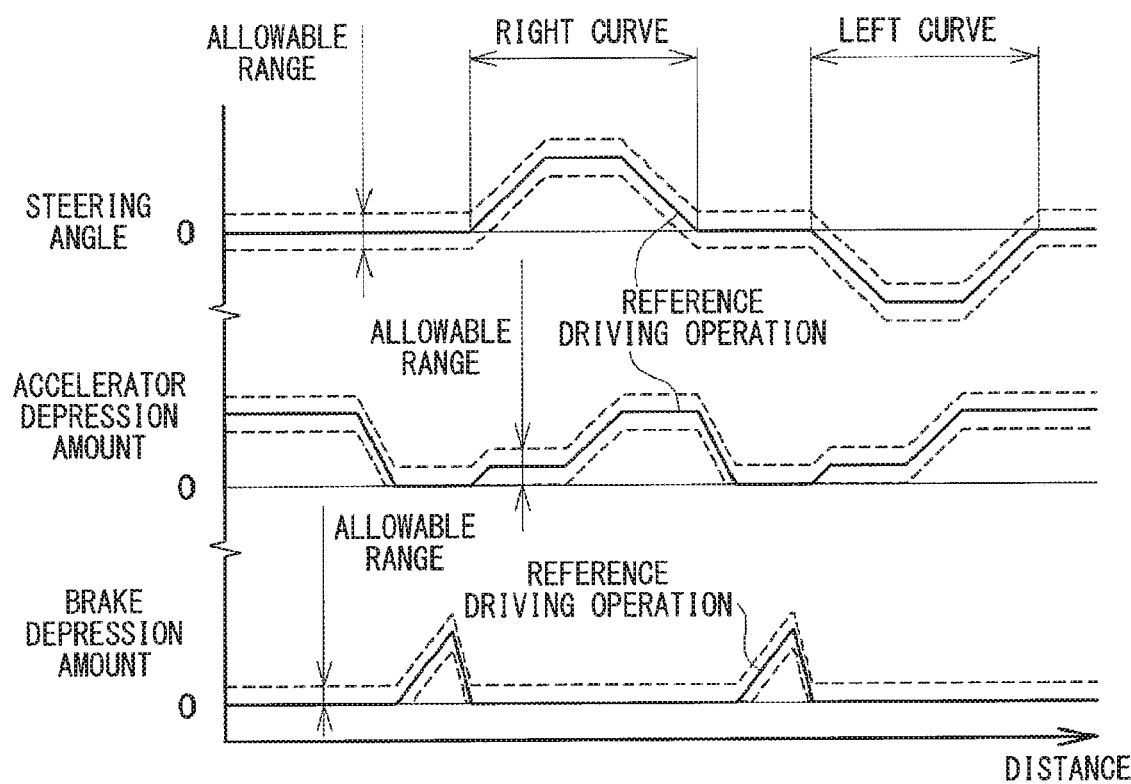
FIG. 11B is an explanatory diagram for the reference driving operation.

FIGS. 11A and 11B illustrate an outline of the reference driving operation. For example, the vehicle 1 is traveling at a position illustrated in FIG. 11A. As illustrated, the road has a curve in the right direction ahead of the vehicle 1. Further, the road has a short straight part after the right curve, and has a curve in the left direction thereafter.

Corresponding to the above, a reference driving operation as illustrated in FIG. 11B is stored corresponding to the current position of FIG. 11A as follows. That is, the steering angle of the steering wheel 2 is zero for a while, then becomes a positive value along the right curve, and then becomes zero again after the right curve. Then, the steering angle becomes a negative value along the left curve, and then becomes zero again.

Further, along with such a steering wheel operation, the accelerator depression amount decreases as the vehicle 1 approaches the curve, and the brake depression amount then increases when the accelerator depression amount becomes zero. Then, the brake depression amount becomes zero and the accelerator depression amount slightly increases when the vehicle 1 gets into the curve, and the accelerator depression amount further increases before the vehicle 1 gets out of the curve.

In the present modification, three operation amount items including the steering angle, the accelerator depression amount, and the brake depression amount are stored as the basic driving operations. However, the present modification is not limited thereto, and another operation amount may be stored as the reference driving operation.

Further, as indicated by a broken line in FIG. 11B, an allowable range having a constant width is set in the basic driving operation. The reason why the allowable range is set will be described below.

After the traveling position of the vehicle 1 and the corresponding reference driving operation are acquired in the above manner (S201 of FIG. 9), a timer (not illustrated) which is incorporated in the travel control apparatus 150 of the modification is started to start a measurement of an evaluation time (S202). That is, even when the driving operation of the driver largely deviates from the reference driving operation after the elapse of a long time from the occurrence of the learning target matter, it cannot be considered that the deviation is caused by the occurrence of the learning target matter. Thus, the timer is started to start the measurement of the evaluation time so that the evaluation range of the driving operation of the driver is a driving operation for a predetermined time from the occurrence of the learning target matter.

When the timer is started (S202), a driving operation which has been actually performed by the driver (actual driving operation) is acquired (S203), and it is then determined whether the evaluation time has reached a predetermined time (S204). When the result shows that the evaluation time has not reached the predetermined time (S204: no), the actual driving operation is acquired again (S203), and it is then determined whether the evaluation time has reached the predetermined time (S204).

When the evaluation time has reached the predetermined time during the repetition of such an operation (S204: yes), it is determined whether the actual driving operation has deviated from the allowable range of the reference driving operation before the elapse of the predetermined time (S205). That is, since the actual driving operation is unlikely to exactly agree with the reference driving operation, the allowable range is set in the reference driving operation, and it is determined whether the actual driving operation has a deviation from the allowable range.

Figure 12:
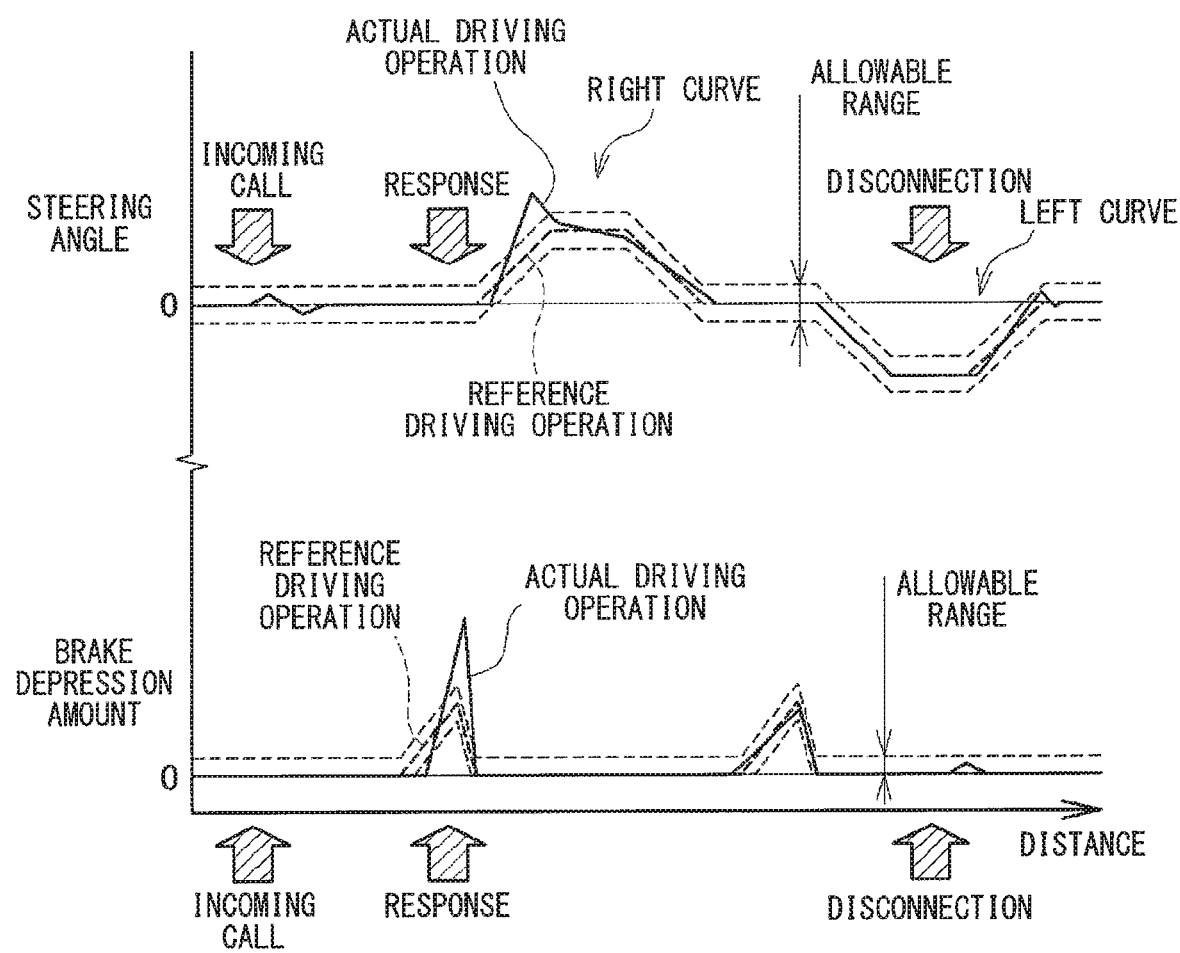
FIG. 12 is an explanatory diagram illustrating the result of a comparison between an actual driving operation which is performed from the reception of an incoming telephone call to the disconnection of the call after having a telephone conversation and the reference driving operation.

FIG. 12 illustrates the result of a comparison between an actual driving operation which is performed by the driver from the reception of an incoming telephone call to the disconnection of the call after having a telephone conversation and the reference driving operation. In FIG. 12, a thick solid line indicates the actual driving operation, and a thick broken line indicates the reference driving operation. Further, in FIG. 12, a thin broken line indicates the allowable range which is set with respect to the reference driving operation.

Although, in FIG. 12, the steering angle and the brake depression amount are illustrated as examples of the actual driving operation, other actual driving operations such as the accelerator depression amount are also acquired. Thus, the following description is also applied to those actual driving operations in the same manner.

For example, immediately after the incoming call, although there is a slight deviation in the steering angle, the deviation does not exceed the allowable range. Further, there is no clear influence on the brake depression amount.

On the other hand, when an operation for responding to the incoming telephone call is performed, there is a delay in the start of a steering wheel operation corresponding to the right curve, and a steering wheel operation thereafter becomes large in order to recover the delay. As a result, the steering angle deviates from the allowable range. The operation for responding to the incoming telephone call is described as an operation of pressing a call start button. However, the operation may be an operation of returning a response message indicating that the driver cannot have a telephone conversation.

Further, also in the brake depression amount, there is a delay in a brake operation for deceleration before the right curve after the operation for responding to the incoming call is performed. As a result, a brake operation thereafter becomes large in order to recover the delay, and the brake depression amount deviates from the allowable range.

Also after the start of the telephone conversation, an operation for returning the steering wheel after the right curve, and the brake operation and the steering wheel operation before the left curve are performed. The telephone conversation is continued also during these driving operations. However, the steering angle and the brake depression amount fall within the allowable range of the reference driving operation.

On the other hand, when an operation for disconnecting the call (e.g., pressing a button for ending a call) is performed, there is a slight delay in a steering wheel operation for getting out of the left curve, a steering wheel operation thereafter becomes slightly large due to the delay, and the brake is also slightly depressed. However, also in this case, the steering angle and the brake depression amount fall within the allowable range.

Thus, in the example illustrated in FIG. 12, it can be considered that although the incoming call does not have a large influence on the actual driving operation of the driver, the response to the incoming call has a large influence on the actual driving operation. Further, it can be considered that the telephone conversation and the disconnection of the call do not have a large influence on the actual driving operation.

In S205 of FIG. 9, it is determined whether the actual driving operation has deviated from the allowable range of the reference driving operation as described above.

In the above description, the actual driving operation for a predetermined time from the occurrence of the learning target matter is stored, and the actual driving operation and the reference driving operation are compared after the elapse of the predetermined time to determine whether the actual driving operation has a deviation from the allowable range.

Alternatively, when the learning target matter occurs, the actual driving operation and the reference driving operation may be compared every time the actual driving operation is acquired until the predetermined time elapses to determine whether the actual driving operation has a deviation from the allowable range, and the result thereof may be stored. Then, after the elapse of the predetermined time, it may be determined whether a determination result indicating that the actual driving operation has deviated from the allowable range is stored.

When the result of the determination of S205 performed in the above manner shows that the actual driving operation has a deviation from the allowable range of the reference driving operation (S205: yes), "1" is added to the number of occurrences and the number of deviations of the learning target matter, respectively (S206).

On the other hand, when the actual driving operation has no deviation from the allowable range of the reference driving operation (S205: no), "1" is added to the number of occurrences of the learning target matter (S207).

For example, in the example illustrated in FIG. 12, four learning target matters including "incoming call", "response", "telephone conversation", and "disconnection" occur, and the following process is performed with respect to each of the learning target matters. First, in "incoming call", the actual driving operation has no deviation from the allowable range. Thus, "no" is determined in S205, and "1" is added to the number of occurrences of the learning target matter of "incoming call" (S207). On the other hand, in "response", the actual driving operation has a deviation from the allowable range. Thus, "yes" is determined in S205, and "1" is added to the number of occurrences and the number of deviations of the learning target matter of "response", respectively (S207). Further, in "telephone conversation" and "disconnection", the actual driving operation has no deviation from the allowable range. Thus, "1" is added to the number of occurrences of each of the learning target matters of "telephone conversation" and "disconnection" (S207).

FIG. 13 illustrates the result of the addition of the number of occurrences and the number of deviations for each learning target matter as described above. In the illustrated example, five learning target matters including "outgoing call" in addition to the four learning target matters of "incoming call", "response", "telephone conversation", and "disconnection" are set as the learning target matters relating to the cellular phone. Here, "outgoing call" is an operation of the driver making a call using a so-called hands-free function during manual traveling. The number of occurrences and the number of deviations are accumulated for each of these learning target matters.

Further, in the learning target matters relating to the audio device, the number of occurrences and the number of deviations are accumulated for each function or for each of the operation buttons 10a to 10f and the operation knob 10g corresponding to each function. Further, similarly in the learning target matters relating to the navigation device, the number of occurrences and the number of deviations are accumulated for each function or for each of the operation buttons 10a to 10f and the operation knob 10g corresponding to each function.

After the accumulation of the number of occurrences and the number of deviations of each of the occurred learning target matters as described above (S206 or S207 of FIG. 9), it is then determined whether the number of occurrences of each of the learning target matters has reached a predetermined minimum number (S208).

For example, in the example illustrated in FIG. 13, the number of occurrences is accumulated for the five learning target matters of "incoming call", "response", "telephone conversation", "disconnection", and "outgoing call" as the learning target matters relating to the cellular phone, and the number of occurrences of each of the learning target matters is compared with the predetermined minimum number (e.g., 5). Similarly for the learning target matters relating to the audio device and the navigation device, the number of occurrences of each of the learning target matters is compared with the predetermined minimum number.

For a learning target matter whose number of occurrences is determined to have reached the minimum number (S208 of FIG. 9: yes) in the result thereof, the number of deviations accumulated for the learning target matter is divided by the number of occurrences to calculate a deviation rate (S209).

In the example illustrated in FIG. 13, the number of occurrences is more than the minimum number (5 in this case) in four learning target matters of "incoming call", "response", "telephone conversation", and "disconnection" among the learning target matters relating to the cellular phone. Thus, the deviation rate is calculated for each of the four matters. On the other hand, the number of occurrences has not reached the minimum number in the learning target matter of "outgoing call". Thus, the deviation rate is not calculated for this matter.

Then, it is determined whether the calculated deviation rate is equal to or higher than a predetermined threshold rate (e.g., 30%) (S210 of FIG. 10). In the example illustrated in FIG. 13, it is determined that the deviation rate is higher than the threshold rate in "incoming call" and "response" among the learning target matters relating to the cellular phone (S210: yes). On the other hand, it is determined that the deviation rate is equal to or lower than the threshold rate in "telephone conversation" and "disconnection" (S210: no). Further, since the deviation rate has not yet been calculated for "outgoing call", it is determined that the deviation rate is equal to or lower than the threshold rate (S210: no).

A similar determination is performed also for the learning target matters relating to the audio device and the navigation device.

The deviation rate calculated for a learning target matter can be considered to represent the degree of influence of the learning target matter on the driving operation of the driver. Thus, the deviation rate of the present modification corresponds to the degree of influence.

For a learning target matter whose deviation rate is determined to be higher than the threshold rate (S210: yes) in the result thereof, it is determined whether the learning target matter has already been set as the concentration disturbing matter (S211).

When the learning target matter has not yet been set as the concentration disturbing matter (S211: no), the learning target matter is set as the concentration disturbing matter (S212). On the other hand, when the learning target matter has already been set as the concentration disturbing matter (S211: yes), it is not necessary to perform setting again, and a process of setting the learning target matter as the concentration disturbing matter (S212) is thus omitted.

On the other hand, for a learning target matter whose deviation rate is determined to be equal to or lower than the threshold rate (S210: no), similarly, it is determined whether the learning target matter has already been set as the concentration disturbing matter (S213).

When the learning target matter has already been set as the concentration disturbing matter (S213: yes), the learning target matter has been set as the concentration disturbing matter in spite of the fact that the deviation rate is equal to or lower than the threshold rate (S210: no). Thus, the learning target matter is deleted from the concentration disturbing matter (S214). On the other hand, when the learning target matter has not been set as the concentration disturbing matter (S213: yes), since it is not necessary to perform deletion again, a process of deleting the learning target matter from the concentration disturbing matter (S214) is omitted.

After the learning target matter is set as the concentration disturbing matter according to the deviation rate (S212) or deleted from the concentration disturbing matter (S214) as described above, the concentration disturbing matter learning process returns to the start, and it is again determined whether a learning target matter has occurred (S200 of FIG. 9). When the result shows that no learning target matter has occurred (S200: no), the process is put on standby until a learning target matter occurs while performing the similar determination. Then, when a learning target matter has occurred (S200: yes), the above series of processes (S201 to S214) is executed.

A learning target matter that is likely to have an influence on the concentration of a driver on the driving operation may differ between drivers or depending on driving environments. Thus, when the concentration disturbing matter is uniformly set, a situation in which although the degree of concentration of the driver on the driving operation is reduced, a switch from manual traveling to automatic traveling is not performed may occur. Further, a situation in which although the degree of concentration of the driver on the driving operation is not reduced, a switch from manual traveling to automatic traveling is performed may occur.

In view of this point, when learning is performed by the concentration disturbing matter learning process of the modification described above, it is possible to make a switch from manual traveling to automatic traveling at the timing when the degree of concentration of the driver on the driving operation is reduced regardless of differences between drivers or driving environments. As a result, it is possible to sufficiently ensure the safety of travel even in the manual travel control state.

The embodiment and the modification have been described above as examples. However, the embodiment is not limited to the above embodiment and modification, and can include various modes without departing from the gist of the present disclosure.

The invention claimed is:

1. A travel control apparatus that controls travel of a vehicle in a control state of one of a manual travel control state for controlling the travel of the vehicle based on a driving operation by a driver and an automatic travel control state for detecting a condition around the vehicle and controlling the travel of the vehicle based on a detected condition, the travel control apparatus comprising:
   a travel control unit that controls the travel of the vehicle in the control state of one of the manual travel control state and the automatic travel control state in accordance with a selection by the driver;
   a concentration disturbing matter detection unit that detects an occurrence of a predetermined concentration disturbing matter set as a matter which disturbs a concentration of the driver with respect to the driving operation; and
   a control state switching unit that switches the control state from the manual travel control state to the automatic travel control state in response to the occurrence of the concentration disturbing matter being detected while the control state is the manual travel control state, wherein:

in response to the concentration disturbing matter not being detected or an elapsed time from when the control state is switched to the automatic travel control state reaching a predetermined threshold time after the occurrence of the concentration disturbing matter is detected, and the control state is switched from the manual travel control state to the automatic travel control state, the control state switching unit switches the control state from the automatic travel control state to the manual travel control state, and the concentration disturbing matter detection unit is configured to detect a plurality of learning target matters as a candidate of the concentration disturbing matter, the travel control apparatus further comprising:

an influence degree evaluation unit that evaluates a degree of influence of each of the plurality of learning target matters on the driving operation by detecting the driving operation after an occurrence of a corresponding learning target matter in response to the concentration disturbing matter detection unit detecting the corresponding learning target matter, wherein:

the influence degree evaluation unit sets one of the plurality of learning target matters as the concentration disturbing matter in response to the degree of influence of the one of the plurality of learning target matters being equal to or larger than a predetermined threshold degree;

the influence degree evaluation unit acquires a reference driving operation which is stored corresponding to a current position of the vehicle;

the travel control unit acquires an actual driving operation which has been actually performed by the driver after the occurrence of a learning target matter, and compares the driving operation with the reference driving operation; and for a state in which a deviation between the actual driving operation and the reference driving operation is larger than a predetermined deviation, the concentration disturbing matter detection unit determines that the learning target matter has an influence on the concentration of the driver on the driving operation.

2. The travel control apparatus according to claim 1, wherein:

the control state switching unit notifies the driver of a switching operation to the automatic travel control state in response to the occurrence of the concentration disturbing matter being detected, and the control state is switched from the manual travel control state to the automatic travel control state; and the control state switching unit notifies the driver of a return operation to the manual travel control state in response to the control state being returned from the automatic travel control state to the manual travel control state.

3. The travel control apparatus according to claim 1, wherein:

the concentration disturbing matter detection unit detects an incoming telephone call to the driver as the concentration disturbing matter.

4. The travel control apparatus according to claim 3, wherein:

the vehicle is equipped with a speaker that outputs a sound toward a vehicle compartment of the vehicle and a sound collection microphone that collects a sound in the vehicle compartment;

the travel control apparatus further comprising:

a sound data relay unit that relays sound data between a telephone preliminarily registered, the speaker and the sound collection microphone, wherein:

the control state switching unit switches the control state from the automatic travel control state to the manual travel control state in response to the incoming telephone call being finished after the control state is switched to the automatic travel control state in accordance with the incoming telephone call of the telephone.

5. The travel control apparatus according to claim 1, wherein:

the vehicle is equipped with an onboard device and an operation unit operated by the driver for operating the onboard device;

the travel control apparatus further comprising:

an operation relay unit that relays an operation of the operation unit to the onboard device; and the concentration disturbing matter detection unit detects an operation of the operation unit as the concentration disturbing matter.

6. The travel control apparatus according to claim 1 further comprising:

a reference driving operation storage unit that stores a reference driving operation corresponding to a traveling route of map data, wherein:

the influence degree evaluation unit evaluates the degree of influence of each of the plurality of learning target matters on the driving operation by comparing the driving operation with the reference driving operation after the occurrence of each of the plurality of learning target matters.

7. A travel control method for controlling travel of a vehicle in a control state of one of a manual travel control state for controlling the travel of the vehicle based on a driving operation by a driver and an automatic travel control state for detecting a condition around the vehicle and controlling the travel of the vehicle based on a detected condition, the travel control method comprising:

determining whether the control state is the manual travel control state;

acquiring a reference driving operation which is stored corresponding to a current position of the vehicle;

detecting an occurrence of a predetermined concentration disturbing matter set as a matter which disturbs a concentration of the driver with respect to the driving operation when the control state is the manual travel control state;

detecting a plurality of learning target matters as a candidate of the concentration disturbing matter;

acquiring an actual driving operation which has been actually performed by the driver after the occurrence of a learning target matter, and comparing the driving operation with the reference driving operation;

determining that the learning target matter has an influence on the concentration of the driver on the driving operation, for a state in which a deviation between the actual driving operation and the reference driving operation is larger than a predetermined deviation;

evaluating a degree of influence of each of the plurality of learning target matters on the driving operation by detecting the driving operation after an occurrence of a corresponding learning target matter in response to detecting the corresponding learning target matter;

setting one of the plurality of learning target matters as the concentration disturbing matter in response to the degree of influence of the one of the plurality of learning target matters being equal to or larger than a predetermined threshold degree; and switching the control state from the manual travel control state to the automatic travel control state in response to the occurrence of the concentration disturbing matter being detected while controlling in the manual travel control state, wherein:

the switching of the control state from the manual travel control state to the automatic travel control state further includes:

switching the control state from the automatic travel control state to the manual travel control state in response to the concentration disturbing matter not being detected or an elapsed time from when the control state is switched to the automatic travel control state reaching a predetermined threshold time after the occurrence of the concentration disturbing matter is detected, and the control state is switched from the manual travel control state to the automatic travel control state.

* * * * *